United States Patent [19]

Jaeger et al.

[11] Patent Number: 4,730,282

[45] Date of Patent: Mar. 8, 1988

[54] LOCATING SIGNAL SOURCES UNDER SUPPRESSION OF NOISE

[75] Inventors: Reinhard Jaeger, Delmenhorst; Peter von Volckamer, Bremen, both of Fed. Rep. of Germany

[73] Assignee: MBB GmbH, Bremen, Fed. Rep. of Germany

[21] Appl. No.: 700,404

[22] Filed: Feb. 11, 1985

[30] Foreign Application Priority Data

Feb. 22, 1984 [DE] Fed. Rep. of Germany ....... 3406343

[51] Int. Cl.⁴ .................................................. G01S 3/80
[52] U.S. Cl. ..................................... 367/124; 367/129; 367/901
[58] Field of Search ...................... 367/21, 124, 49, 50, 367/63, 65, 93, 901, 135, 126, 129; 364/574, 582; 181/125; 381/71, 94; 455/296

[56] References Cited

U.S. PATENT DOCUMENTS 4,594,695  6/1986  Garconnet et al. ................. 367/901

OTHER PUBLICATIONS

Fisher et al., "Jet Engine Noise Source Location . . . ", J. Sound & Vibration, vol. 51, #1, 1977, pp. 23–54.

*Primary Examiner*—Thomas H. Tarcza
*Assistant Examiner*—Ian J. Lobo
*Attorney, Agent, or Firm*—Ralf H. Siegemund

[57] ABSTRACT

A method for locating signal sources, particularly sound signal sources, is suggested using several spacially separated sensors whose output signals are processed in order to detect noise and to eliminate such noise under utilization of a normalizing factor, the normalizing factor considers particularly those frequencies which, for one reason or another, are uniquely attributable to noise.

4 Claims, 4 Drawing Figures

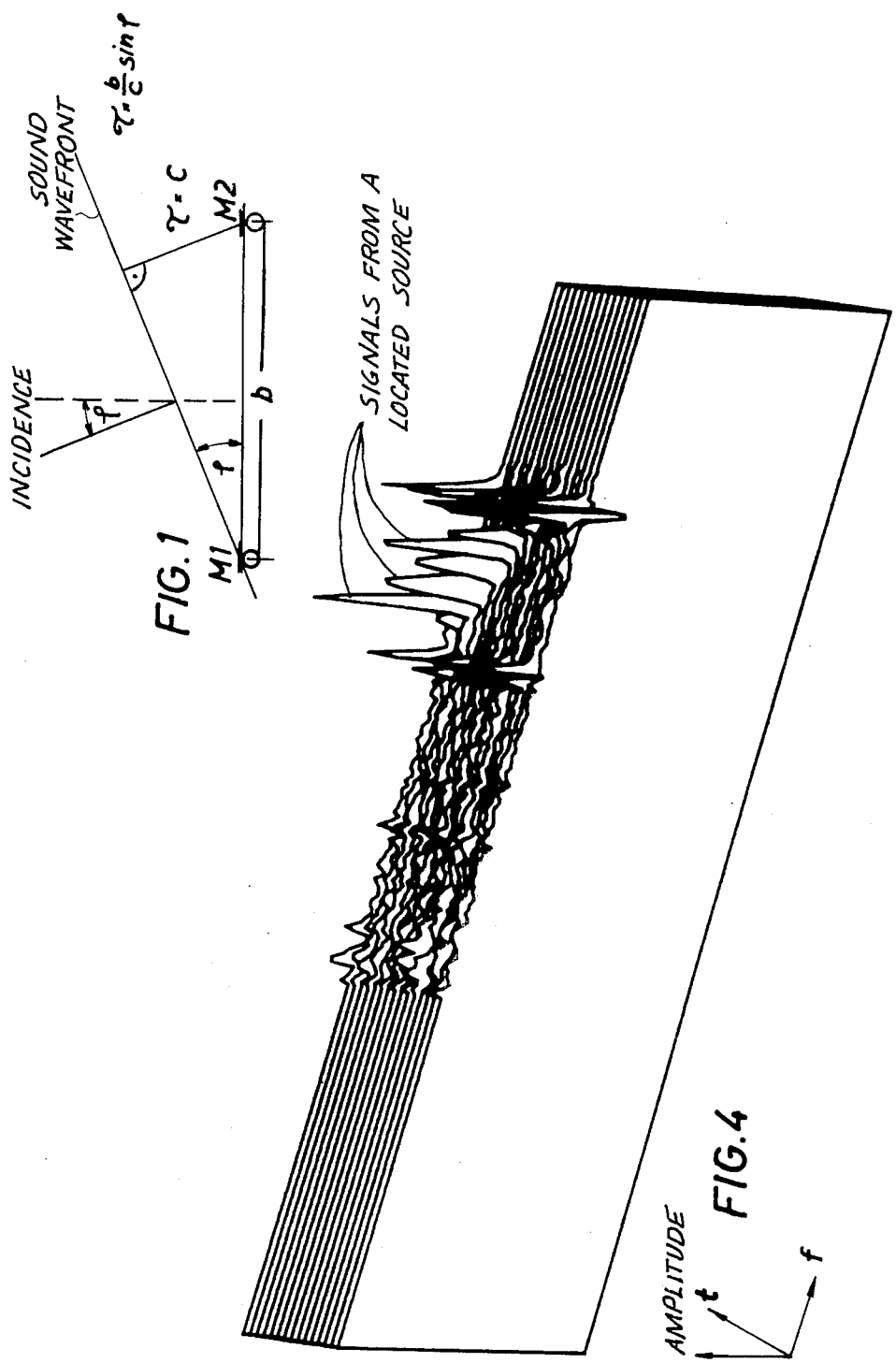

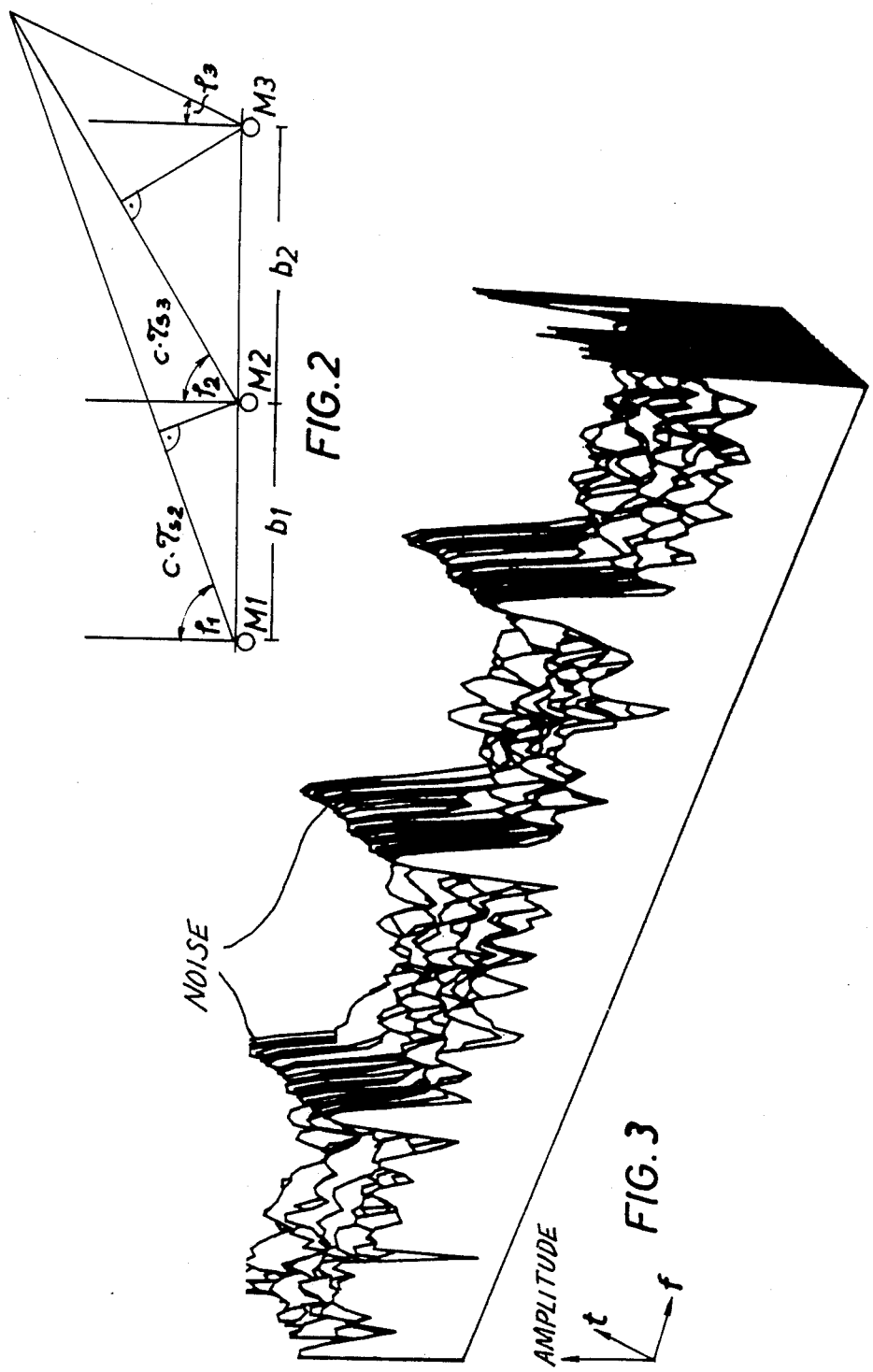

LOCATING SIGNAL SOURCES UNDER SUPPRESSION OF NOISE

BACKGROUND OF THE INVENTION

The present invention relates to the locating of signal sources, particularly sound signal sources, under utilization of several spacially separated sensors or tranducers producing output signals which are linked under utilization of the principle of a cross-power density for purposes of producing information being indicative of the direction of the located signal sources.

For locating signal sources it is customary to acquire signals of interest, particularly signals within a certain range, by means of appropriately configured and designed sensors and transducers, and to evaluate the signals as received in accordance with a particular procedure. For example, sound sensors, such as microphones, monitor a certain area, for example, in the military field, in order to locate as soon as possible sound-producing target sources. Adequate function requires of course that undesired noise signals, i.e., signals from sources other than those of the type one wishes to locate, do not interfere in the locating procedure. However, this is a presumption which cannot always be made. Therefore, in the general case it will be necessary to suppress noise and noise signals in order to separate them from signals transmitted from sources which are to be located. This is particularly important if, for example, the locating device itself is mounted on a noise-producing vehicle. In such a case, it is possible to locate sound sources only if in fact the sound produced by the vehicle on which the equipment is mounted, can be suppressed. Herein of course it is of particular significance that this noise-producing source is located much closer to the sensor than any of the target sources; the noise may be much stronger than the acoustic signals to be detected.

DESCRIPTION OF THE INVENTION

It is an object of the present invention to provide a new and improved method for locating signal sources of the type mentioned above and being particularly capable of eliminating the sound from interfering noise-producing sources, including particularly noises which in a general sense are produced by the equipment and carrier equipment itself.

In accordance with the preferred embodiment of the present invention it is suggested to ascertain the transit time of signals produced in sensors at an oblique angle of incidence, and to normalize the result under consideration of the transit time and amplitude differences among several signals so as to normalize signals from particular sensors, and to subtract the result from an unnormalized signal in another sensor for purposes of eliminating noise sources.

The inventive method offers the possibility to eliminate interfering signals and noise-signal components from the output signals of several spacially separated sensors, particularly sound sensors, under utilization of boundary conditions which are known as such. Once output signals of sensors have been freed from noise and interfering signals, it is then possible under utilization of the principle of cross-power density to obtain information as to the direction of sound-producing targets. The inventive direction is based on the recognition that signal frequencies with the highest amplitudes within well defined frequency ranges can be identified as sound signals, and can be used to gain from that particular information the required normalizing, noise suppressing factors. It is furthermore advantageous to acquire separately a normalizing factor for each signal frequency, separately (noise line) ascertained independently as signal from a noise source. These particular noise or interfering lines within the frequency band of interest are to be considered selectively in the elimination process.

The inventive procedure permits to suppress, in addition to the main noise frequencies, also secondary noise frequencies, such as harmonics or subharmonics or noise transmitted from other locations, and they are thus considered separately in the elimination process for noise from the sensor output signals. The normalizing factor or factors may in this case consist of the quotient of complex vectors of two sensor output signals, whereby this particular quotient constitute a complex factor which considers attenuation and transit time on the basis of the spacial separation of the sensors.

The inventive method therefore permits the acquisition of noise signals under utilization of only a few, for example, three acoustical signals under utilization of pronounced and well defined directional characteristics, for locating targets under complete suppression of noise coming from other directions. After the cross-power density has been formed, one obtains a considerable improvement in the directional acquisition of sound sources, and correspondingly a more precise information on the direction of the noise source as well as sound sources of interest.

The method is generally applicable in the acquisition of any kind of signals, particularly if the following boundary conditions are satisfied: The information signals as received are a composite of desired information signal and noise. The processing involves a particular range of frequencies; one has available at least two sensors and their corresponding output signals, and the noise signals are unambiguously identifiable within the received frequency range. It must be appreciated that the desired signals are, technically speaking often also just noise. Within the context of this invention, noise is sound from a known source, and desired sound may be noise or regular sound but originating from a source to be located.

DESCRIPTION OF THE DRAWINGS

While the specification concludes with claims particularly pointing out and distinctly claiming the subject matter which is regarded as the invention, it is believed that th invention, the objects and features of the invention, and further objects, features and advantages thereof will be better understood from the following description taken in connection with the accompanying drawings in which:

FIG. 1 is a diagram explaining in principle the acquisition of an angle of incidence under utilization of two sound sensors using difference in transit time of the information signal received;

FIG. 2 illustrates analogously a diagram for transit time acquisition under utilization of three sound sensors and an additional powerful noise source in the vicinity of the acquisition device;

FIG. 3 is a three-dimensional topographic plot and diagram showing sound signals as received and plotted; and FIG. 4 illustrates a three-dimensional topographic plot and diagram of sound signals from which noise signals have been eliminated in accordance with the method of the present invention by practicing the best mode thereof.

Generally speaking, the inventive method desires to suppress noise signals from desired sound signals under consideration of the fact that the noise signals emanates also from a source having a well defined direction vis-a-vis the acquiring device. One bases the method on the consideration that for a defined distance of two sound sensors from each other a difference in transit time, i.e., a differential in the acquisition instances of a particular sound signal component corresponds to a particular direction from a sound source to each of the two sensors. Take FIG. 1, the angle $\rho$ vis-a-vis a normal on a baseline between two microphones M1 and M2, denotes the angle of incidence of sound. The difference in transit time yields information on that angle in accordance with the following formula $$\tau = b/c \sin \rho$$

wherein b is the distance between the two microphones M1 and M2, c is the speed of sound, and $\tau$ is the transit time differential. It follows generally that if one subtracts the signals as received by microphone M1 from the signal as received by the microphone M2, using a delay for the M1 signal equal to said value $\tau$ then the difference signal should be zero. If it is assumed that a local source producing sound interferes with the receiving, then the composite signal, may in fact be suppressed in its entirety however, one has to consider in addition that relative amplitude attenuation may occur or be observed to be effective in the two signals as received by M1 and M2.

Another factor to be considered is the following: The method for suppressing signals from interfering noise sources is preferably realized on a basis that is limited to a certain frequency range. This is practical because two defined spectra pertaining respectively to an intefering source and a desired source is relatively easy to ascertain. Therefore, one ascertains within the particular frequency spectrum of interest, and from within the particular signals as received in a sound sensor, those signal frequencies with the largest amplitude because it can always be assumed that such a frequency or frequencies within the frequency range of interest constitutes the base or lowest harmonic of the noise frequency. As to this basic frequency of the noise source, one acquires and calculates subsequently a normalizing factor which, as will be explained more fully below, constitutes a complex factor.

The complex components of the output signals of the two microphones M1 and M2 have the following configuration.

$$\mathcal{A}_{M1} = A_{M1} \cdot e^{j\omega t}$$

$$\mathcal{A}_{M2} = A_{M2} \cdot e^{j\omega(t-\tau s)}$$

From these indicators one can extract the delay differential or propogation time differential $\tau_s$ and one can calculate the following normalizing factor G.

$$G_\omega = \frac{\mathcal{A}_{M1}}{\mathcal{A}_{M2}} = \frac{A_{M1}}{A_{M2}} \cdot e^{j\omega\tau s}$$

$$G_f = \frac{\mathcal{A}_{M1}}{A_{M2}} \cdot e^{j2\pi f\tau s}$$

The two components of the normalizing factor therefore include the transit time differential between the microphones and in relation to the angle of incidence of sound, and they include also each an amplitude matching factor. The frequency spectrum of the output signal from M2 is now evaluated, i.e., processed on the basis of this particular normalizing factor G and this thus evalued microphone signal is then subtracted from the output signal of microphone M1. In a formal manner, the compensated output signal $\mathcal{A}_k$ is therefore given by $$\mathcal{A}_k = \mathcal{A}_{M1} - G \cdot \mathcal{A}_{M2}$$

Within this particular output signal, one obtains a very strong suppression of the basic frequency of the noise signal. However, secondary noise frequencies resulting, for example, from subharmonic and harmonic frequencies of the base frequencies and/or coming from different locations, will still be contained in this processed signal. In order to obtain optimum compensation, at least of the interference by one noise source, it is therefore necessary to suppress, in addition to the base frequency, also the subharmonic and harmonic frequencies of the principal noise signal. For this it is necessary to obtain information on a normalizing factor having validity for the harmonic and subharmonic frequencies of the noise signal, and to apply this more complex normalizing factor in the stated manner. The requisite calculations can be carried out on the basis of measurements, particularly under utilization of a known noise signal, and under consideration of known relations, for example, by considering the position of the first harmonic noise frequency within the frequency spectrum in appropriately conducted test considering, for example, that the first harmonic may have a frequency of f/6 wherein f is the base frequency of the noise. Depending upon the general composition of a noise frequency, it is therefore of advantage to acquire the respective normalizing factor as will be described next. Let fSG be the base frequency of a noise source, and let fSN be any secondary frequency of that source, then one can write the following relation:

$$f_{SN} = n \cdot \frac{f_{SG}}{6} ; n = 1, \ldots, m$$

A frequency dependent normalizing factor GF is then given by $$G_f = G_{fsn} \frac{f_{n+1} - f}{f_{n+1} - f_n}, G_{fsn+1} \frac{f - f_n}{f_{n+1} - f_n}$$

wherein $1 \leq M \leq 9$ and fSN is a frequency within the desired spectrum, but attributable to a noise frequency within that spectrum. The configuration of the previously mentioned compensation $S_f$ has the advantage that in the case of a phase equalization one obtains a linear transition of the spectral frequency, whereby the non-linear interpolation of the amplitudes is of negligible effect.

As can be seen from FIG. 2, a noise source may be situated very close to the microphones. This will be the case, for example, if, as stated above, the locating device is mounted on a vehicle which produces noise. In this case then, there is a noticeable difference between the angle of incidence; also from the parasitic noise source and from the source of interest and the relative amplitudes are different from the noise signal and for the desired signal. The noise will be suppressed in a manner using three microphones M1, M2 and M3 as depicted in FIG. 2, and one can, for example, write the following relationships:

Noise in microphone 1, $$M_1 = S_w \cdot e^{jwt}$$

Noise in microphone 2, $$M_2 = d_2 \cdot S_w \cdot e^{jw(t-\tau_{S2})}$$

Noise in microphone 3, $$M_3 = d_2 \cdot d_3 \cdot S_w \cdot e^{jw(t-\tau_{S2}-\tau_{S3})}$$

wherein d2 is the amplitude attenuation for the noise as it is effective between M1 and M2; d3 is in the amplitude attenuation of the noise when M2 is compared with M3. $\tau_{S2}$ is the transit time of the noise as between M1 andd M2, and $\tau_{S3}$ is the transit time for the noise as between M2 and M3, both values for the particular angle of incidence for the noise. The signals as acquired by means of the microphones are composed of the desired signal coming from some far-away source, and noise signal originating nearby, and mathematically the signals received by the microphone can be expressed as follows:

$$M_1 = A_w \cdot e^{jwt} + S_w \cdot e^{jwt}$$

$$M_2 = A_w \cdot e^{jw(t-\tau_{N2})} + d_2 \cdot S_w \cdot e^{jw(t-\tau_{S2})}$$

$$M_3 = A_w \cdot e^{jw(t-\tau_{N2}-\tau_{N3})} + d_2 \cdot d_3 \cdot S_w \cdot e^{jw(t-\tau_{S2}-\tau_{S3})}$$

A compensation between the individual signal components can be obtained by using the following relationships:

$$M_{\frac{1}{2}k} = M_1 - \frac{1}{d_2} \cdot e^{j\omega\tau_{S2}} \cdot M_2$$

$$M_{\frac{3}{2}k} = M_2 - \frac{1}{d_3} \cdot e^{j\omega\tau_{S3}} \cdot M_3$$

By "plugging" into the latter equation previously acquired signals for M1, M2 and M3, one can ascertain the requisite relations for the compensated microphone signals. These compensated microphone signals are then used for forming the cross-power density in order to obtain information on the direction of the thus located target source. The compensated microphone signal, however, still contains an error which is effective in the amplitude as well as in the phase, which error is dependent upon the compensation coefficient and from the direction of incidence of the desired signal. If the interfering signal is, relative to the sensor equipment, stationary, one can include a correcting factor for the angle of the desired signal under the assumption that the compensation coefficient is constant. On the other hand, a correction for noise signals originating from far afield is not necessary because with distance the correcting factor rapidly approaches unity.

FIG. 3 illustrates a three-dimensional topographic plot and diagram in which amplitude, frequency and time-of-receiving are plotted for a microphone signal which still includes the noise component, i.e., FIG. 3 in fact depicts raw information. One can recognize immediately from this diagram those frequencies which are attributable to nearby sources having a particular base frequency, as well as harmonic and subharmonic frequencies. It can also be seen that these noise signals are so strong and superimposed upon desired information in such a manner that the desired information is almost completely hidden, in other words, the raw signal as such is not suitable for acquiring directional information.

FIG. 4 illustrates the same instance, but the microphone signal has now been compensated as per the equations above, which means that the parasitic noise frequencies, base frequency as well as harmonic and subharmonic frequencies, have been eliminated, and now one can recognize very clearly signals originating from a target. The transit time difference in two or three microphones, as far as these desired signals are concerned, will now yield directly information on the direction. They will be processed in the usual cross power density fashion, and permit the locating of a noise-producing target.

The invention is not limited to the embodiments described above, but all changes and modifications thereof not constituting departures from the spirit and scope of the invention are intended to be included.

What is claimed is:

1. Method for locating signal sources under utilization of several, spacially separated sensors which are responsive to signals from said sources and produce output signals to be related to each other in accordance with the principle of cross power density, for acquiring information on the direction of such signal sources, comprising the steps of:
    first, acquiring, as a preparatory step, and through the plurality of sensors, transit time differences resulting from oblique angles of incidence of noise signals originating from a parasitic noise source other than a signal source to be located;
    establishing a normalizing, noise suppressing signal under consideration of transit time differences and amplitude differences for particular sensors;
    second, acquiring signals by means of said sensors, said latter signals include as components, noise signals from the parasitic source and signals from said signal source; and
    subsequently subtracting said normalizing signal from an unnormalized signal, respectively being the signals as acquired by the second acquiring to thereby eliminate from the second acquired signal component signals originating in parasitic noise sources.

2. Method as in claim 1, wherein said first acquiring step includes particularly the ascertaining of signal frequencies with relatively high amplitudes and particular frequencies and using these values in the establishing step for providing a normalizing factor for purposes of eliminating noise having these particular high amplitudes pursuant to the subtracting step.

3. Method as in claim 2 including the step of providing several normalizing factors for different high amplitude frequencies so as to obtain selective elimination.

4. Method as in claim 1 wherein said normalizing signal is formed by generating the complex quotient of amplitude and related phase of two sensor output signals.

* * * * *